(12) United States Patent
Evans et al.

(10) Patent No.: US 6,508,930 B1
(45) Date of Patent: Jan. 21, 2003

(54) METHOD FOR STABILIZING OPERATION OF FLUID CATALYTIC CONVERTER UNITS

(75) Inventors: Martin Evans, Tolland, CT (US); Albert A. Vierheilig, Savannah, GA (US); John A. Paraskos, San Rafael, CA (US)

(73) Assignee: Intercat, Inc., Sea Girt, NJ (US)

( * ) Notice: Subject to any disclaimer, the term of this patent is extended or adjusted under 35 U.S.C. 154(b) by 363 days.

(21) Appl. No.: 09/069,300

(22) Filed: Apr. 29, 1998

(51) Int. Cl.[7] .............................................. C10G 11/00
(52) U.S. Cl. ...................... 208/113; 208/152; 208/164; 208/DIG. 1
(58) Field of Search ................................ 208/113, 152, 208/155, 158, 160, 163, 164, DIG. 1

(56) References Cited

U.S. PATENT DOCUMENTS

| | | | | |
|---|---|---|---|---|
| 3,639,228 A | * | 2/1972 | Carr et al. ................... | 208/153 |
| 4,325,808 A | * | 4/1982 | Kim et al. ..................... | 208/65 |
| 4,325,817 A | * | 4/1982 | Bartholic et al. ........... | 208/164 |
| 4,750,989 A | * | 6/1988 | Soderberg ................... | 208/143 |
| 4,875,994 A | * | 10/1989 | Haddad et al. ............. | 208/113 |
| 5,009,771 A | * | 4/1991 | Clark et al. ............ | 208/216 PP |
| 5,389,236 A | | 2/1995 | Bartholic et al. | |

* cited by examiner

*Primary Examiner*—Bekir L. Yildirim
(74) *Attorney, Agent, or Firm*—Elliot M. Olstein; Raymond J. Lillie (57) ABSTRACT

The operation of fluid catalytic converter (FCC) units can be stabilized through use of tests wherein a first catalyst and a second catalyst are introduced into the FCC unit in at least two different ratios, at two different times, in order to establish the effect of these catalyst ratios on a given operating parameter. This information is used to establish a unit response curve (or unit response envelope) for the catalyst ratios versus the operating parameter. This unit response curve (or envelope) is thereafter used to control the operation of the FCC unit.

14 Claims, 9 Drawing Sheets

METHOD FOR STABILIZING OPERATION OF FLUID CATALYTIC CONVERTER UNITS

BACKGROUND OF THE INVENTION

1. Field of the Invention

The present invention generally relates to the use of fluid catalytic converter (FCC) units. More specifically, it relates to methods for stabilizing the operation of multiple-catalyst-employing FCC units by use of predetermined amounts and ratios of certain catalysts used therein.

2. Description of the Prior Art

FCC units carry out processes that are employed throughout the petroleum refining, chemical and petrochemical industries. These processes are frequently destabilized by changes (deliberate, as well as unavoidable changes) such as (1) variation in the character of the feedstock being supplied to such units, (2) selection of different products to be made by such units, (3) selection of different grades of a product being made by such units, and (4) imposition of more stringent legal requirements (e.g., lower air pollution levels) upon such units.

Those skilled in this art will appreciate that any increase in a FCC operator's ability to anticipate the operation of, and/or more closely control, a process being carried out by a FCC unit will usually serve to minimize the use of, and hence the costs of, the very expensive catalyst consumed by that unit. The ability to anticipate the operation of such units also serves to reduce the complexities associated with the sometimes competing, and sometimes complimentary, effects caused by simultaneous use of several different catalysts species in such units. A FCC unit that is operating on a more stable basis also will generally tend to provide end products having more consistent quality attributes.

In order to better appreciate applicant's methods for stabilizing the operation of FCC units, it is helpful to envision their general mode of operation. Typically, a bulk catalyst inventory of tons, indeed, even hundreds of tons, of catalyst flow (often at high velocities) through the fluidized beds, reaction zones, and regeneration zones that make up such units. Next, it should be appreciated that the total catalyst inventory circulating through such a unit is usually comprised of a host catalyst (that carries out the primary catalytic function of the unit) and several distinct types of catalyst additives (that carry out secondary catalytic and/or sorbent functions). That is to say that various additives are used to carry out certain "secondary" functions that are, in some way or another, associated with the primary catalytic function. Preferably, the catalyst additives are distributed, to a high degree of homogeneity, in the host catalyst. Since the host catalyst carries out the primary catalytic function of a FCC unit (e.g., cracking a petroleum based feedstock), it usually comprises from about 80 to about 99 weight percent of the total catalyst inventory in such unit. Catalyst additives usually comprise the remaining 1.0 to 20.0 percent of their total catalyst inventory.

Each catalyst particle species (host catalyst or catalyst additive) introduced into a FCC unit will eventually disperse through the existing host catalyst/catalyst additive inventory and, at its own rate, be chemically deactivated, attrited, broken into smaller and smaller fragments that are eventually elutriated from the unit. The rate at which each catalyst particle species is chemically deactivated, attrited and elutriated is determined by the catalytic activity, hardness, durability, particle size and density characteristics of that particular catalyst particle species. Ideally, each different catalyst species will be introduced into the FCC unit in a manner and at a rate such that the overall host catalyst/catalyst additive system will settle down to some desired steady-state performance level as quickly as possible.

An FCC operator also would like to be able to respond, as quickly as possible to any changes (e.g., changes in quality or product distributions) that might arise so that the unit can be brought back to a steady-state mode of operation. Such responses usually need to be carried out while, to the fullest extent possible, maintaining one or more desired FCC unit performance levels and while maintaining, as much as possible, one or more "secondary" operating characteristics. For example, a FCC unit used to refine petroleum may be called upon to convert a given petroleum feedstock primarily into a gasoline product of a given octane rating at a given rate of production while, simultaneously, holding the unit's output of pollutants (e.g., $SO_x$, $NO_x$, CO, etc.) to certain legally prescribed levels—regardless of changes in the character of the petroleum feedstock (e.g., regardless of an increase in the sulfur content of the feedstock petroleum). Other common technical or economic operating goals or characteristics that a petroleum refinery operator might wish to achieve might include (but, by no means be limited to) (1) better control of the relative proportions of various end products being made by the unit (e.g., obtaining prescribed $C_3$–$C_4$ product yields while limiting production of ethane, ethylene, methane and hydrogen), (2) low coke lay down rates (i.e., low rates of coke deposit on the FCC catalysts particles), and/or (3) achievement of economic goals (for example, obtaining the greater economic value, and hence profit, associated with gasoline products having higher research octane numbers).

The individual catalyst particles used in FCC units are usually comprised of a catalytically active component (e.g., a zeolite) and a generally "inert" matrix or binder material that serves primarily to hold particles of the catalytically active component (e.g., zeolite) in a catalyst/binder composite particle. This binder/catalyst format is generally used to make both host catalyst particles and catalyst additive particles. Depending on the nature of the catalytically active catalyst, the process being carried out, the severity of the temperature, pressure, particle velocity, etc. conditions in the FCC unit, economic considerations, and so forth, any given catalyst particle may have relatively small amounts (e.g., 1%) to relatively large amounts (e.g., 50%) of the catalytically active component embedded in a binder or matrix material such as alumina, silica, etc.

Hence, the "ratios" of any two or more catalysts used in a FCC process are often normalized to a common unit of comparison such as a common unit of weight (e.g., pounds). That is to say that the weight of a first type of active catalyst in a first particle species, is preferably compared to the weight of a different type of active catalyst in a second particle species. For example, if the first particle species and the second particle species weighed the same, but the first particle species were comprised of 10% by weight of active catalyst A and 90% by weight of binder material, and the second particle species were comprised of 50% by weight active catalyst B and 50% by weight binder material, then in order to get the same amount by weight of catalyst A and catalyst B for a "per unit weight" comparison, five times as much of the first catalyst species would be employed.

Next, it should be appreciated that in most cases, any given FCC function, operating characteristic or parameter is often regarded as being achieved through use of one particular catalyst species—even if this may not be literally true. That is to say that any given FCC function may be, and often is, influenced to some degree by other catalyst species that are placed in a FCC unit in order to carry out other, often entirely different, catalytic functions. By way of example only, a catalyst additive species that is used to reduce $SO_x$ emissions may also effect $NO_x$ emission, CO emissions, and perhaps even the primary catalytic function being carried out by the bulk catalyst. Indeed, such secondary effects are known to take place as a result of the use of (1) different catalyst additive species, (2) different bulk catalyst species and (3) a given bulk catalyst species used in conjunction with a given catalyst additive species.

Moreover, the complexities associated with the simultaneous use of several different catalyst species will often be greatly magnified in those cases where the chemical reaction (s) being carried out in a FCC unit is (are) themselves complex. For example, since petroleum is comprised of literally hundreds of different kinds of molecules, any catalytic reactions carried out with respect to petroleum will be inherently complex. Indeed, this would be the case if only one catalyst species were being employed to refine a petroleum feedstock. When multiple catalyst species are employed with respect to such a complex array of molecular types, the situation becomes all the more complex. And, against this background of complexities, it also should be understood that every individual FCC unit has its own unique operating characteristics and that this fact introduces yet another layer of complexities into any attempts to control its operation.

The FCC prior art has dealt with this array of complexities in various ways. For example, FCC operators, using their experience and judgment as to the appropriate amount(s) of catalyst(s) to use, may simply add catalyst(s) to a base level at which they have had good experiences in the past and then try to meet each immediate problem (such as a change in a factor affecting an operating parameter, for example, a change in the character of the petroleum feedstock) as it arises. This method of adding catalyst(s) often wastes large amounts of a given catalyst in order to meet each new situation as it arises.

Experience has also shown that it is difficult to achieve long term operating stability, and hence maximum profitability, by this method since most operators are usually more concerned with getting an "upset" FCC unit back to some desired output level as quickly as possible—rather than immediately concerning themselves with the optimum amounts of the catalyst needed to do this on a longer term basis. It also should be noted that, when such upsets occur, the all too human tendency of many FCC operators is to add much more of a given catalyst than is actually prescribed in order to correct the problem at hand as quickly as possible in order to get through their work shift with as few glaring problems as possible. Unfortunately, a high price is usually paid for these "overdosing" practices since catalysts in general, and catalyst additives in particular, are very expensive materials. Moreover, any given overdosing of one catalyst species often creates competing demands or problems that create a need for the use of another catalyst species which also may be overdosed and lead to a cascading series of upset conditions.

This situation was improved somewhat when the addition of catalyst(s), and especially catalyst additives, was (were) managed by programmed computerized control devices such as central control units (CPUs) that both continuously monitor and control the amounts of any given catalyst species added to a FCC unit. Ideally, a given amount of catalyst (e.g., a catalyst additive) is injected into a FCC unit at regular time intervals. These regular time intervals are usually established by prior testing of that particular FCC unit with respect to its use of a given catalyst species.

Each such catalyst addition can also be programmed and controlled by a CPU to respond to upset conditions as they arise. For example, the catalyst system disclosed in U.S. Pat. No. 5,389,236 ("the '236 patent") teaches addition of a catalyst to a FCC unit either on a predetermined schedule or on an "as needed" basis that may be determined by a discrepancy between the amount of catalyst that "should have been added" and the amount that is actually added. In this particular system, any differences in these two amounts are determined by constantly weighing each catalyst hopper feeding the FCC unit.

The '236 patent also teaches that the most reliable basis for determining the proper amount of catalyst to be added to a given FCC unit, under a given set of operating conditions, can be determined by prior tests of that particular FCC unit wherein the effects of a given catalyst species on a given operating parameter are established by injecting a known amount of that catalyst species into that unit and then noting its effect on a selected FCC parameter. In other words, this is the FCC art's attempt at invoking one of the most venerable techniques known to science and engineering, namely: "holding all other things equal" while varying one factor (the injection of a specific catalyst species) and then noting the consequences of that catalyst injection on a given operating parameter.

In the case of testing FCC units, however, holding all other variables constant in order to test the effects produced by a given catalyst species has proven to be a difficult (and many would say "impossible") task. Still, this method of establishing what effects will follow from the use of a given catalyst species, under the conditions created by a given FCC unit, is widely employed because, heretofore, there has been no better way of dealing with the complexities inherent in the operation of those FCC units that simultaneously employ multiple catalyst species.

Consequently, the effects of a given catalyst species on a given operating characteristic of a given FCC unit are tested by injecting a given amount of a single catalyst species into a given FCC unit on a one time, two time, three time, etc. basis—over a given time span. The effects of such injections on the operating parameter are then plotted in order to gain insights into how that particular catalyst species affects the operating parameter under consideration. This information is then used to create an operating curve based upon the effects of the given catalyst species with respect to the given operating parameter (e.g., $SO_x$ emissions). A similar test might be conducted with respect to that catalyst's ability to affect some other operating parameter (e.g., $NO_x$ emissions). Such tests with respect to other parameters will produce other operating curves that a CPU may be programmed to follow. In effect, these operating curves are stored in the CPU's memory and used as reference curves for future operation of the FCC unit's catalyst addition system. Heretofore, this method of testing the ability of a single catalyst species to affect a given operating parameter has not produced particularly good results—and hence, have not produced particularly reliable operating curves upon which to base future operation of the FCC unit.

SUMMARY OF THE INVENTION

Applicants have found that much better insights into the operation of a given FCC unit with respect to various operating characteristics or parameters of that unit (e.g., $C_3$–$C_4$ yields, operating costs, $SO_x$ emissions, $NO_x$ emissions, CO emissions, CO combustion, gasoline sulfur reduction, olefin product make, olefin product molecular structures, vanadium reduction, etc.) can be achieved if the unit is subjected to injection tests wherein two or more catalysts species are tested more or less contemporaneously. Preferably, each of the two or more catalyst species being used in such test injections should have, in its own right, a detectable effect on the same operating parameter. For example, if each of two different catalyst species (e.g., catalyst species A and catalyst species B) each has an effect on, for example, $SO_x$ emission levels from the FCC unit, a more accurate and/or more useful operating curve can be obtained (relative to the accuracy and usefulness of two separate curves created by separate testing of each of the two different catalyst species). These more accurate and/or more useful operating curves are subsequently used to control the FCC unit during its subsequent "normal" use (as opposed to its use in the initial testing procedures that produce such unit response curves).

Therefore, the testing methods described in this patent disclosure are based upon use of at least two (and preferably more) injections of at least two different proportions of multiple catalyst species in order to establish an operating curve with respect to a given operating characteristic or variable. The goal of applicant's testing methods is to obtain an operating curve that is thereafter used to attain (or to maintain) a given performance in the FCC unit with respect to a given operating parameter (e.g., $SO_x$ production, $NO_x$ production, $C_3$–$C_4$ yields, CO emissions, CO combustion, gasoline sulfur reduction, olefin product make, olefin product molecular structures, vanadium reduction, operating cost, etc.) that is influenced by each of the two or more catalyst species that are to be employed in the FCC unit. Again, each of the catalyst species used in such tests should be used in an amount that is, in and of itself, capable of effecting the operating parameter being studied. It should also be noted that during subsequent operation of the FCC unit, changes in the operation of that unit can be affected by injection of either or both of the subject catalysts (e.g., by an injection of catalyst A, catalyst B or a mixture of catalyst A and catalyst B).

Those skilled in this art will appreciate that almost all catalysts introduced into a FCC eventually will become "inactive." This inactivity results from the fact that the catalyst particles can no longer be regenerated (e.g., by burning off carbonaceous materials deposited on the surface of the catalyst particles), and/or because the catalyst particles are eventually physically destroyed by the harsh environments existing in FCC units. Depending on the nature of the specific catalysts species, such deactivation may take a few hours or several days. The length of the deactivation period for any given catalyst species to some degree, will be known by the prior experience of FCC operator and/or the catalyst manufacturer. For example, the deactivation period for a $SO_x$ catalysts may be 3 or 4 hours while that of a zeolite hydrocarbon cracking catalyst may be 3 or 4 days. Be the length of such deactivation periods as they may, the preferred method for conducting the tests of this patent disclosure is to make the first catalyst A:catalyst B injection and wait then for the catalyst A:catalyst B system to substantially (e.g., more than 60% deactivate) deactivate. After the longest-lived catalyst of the catalyst system (catalyst A or catalyst B) has substantially deactivated, the second test is carried out using a different catalyst A:catalyst B ratio. That is to say that, preferably, the second test will give the most accurate test results after the catalytic effects of the first test have substantially "worn off" i.e., less reliable (and hence less preferred) test results will be obtained in a second test if the FCC unit is still under the effects of the first test.

The testing and FCC unit stabilization and/or control methods of this patent disclosure may be expanded to include 3, 4, 5, etc. different catalyst species used in 3, 4, 5, etc. different relative proportions or ratios. Again, it is preferred that each such catalyst species be capable of influencing the same operating parameter, e.g., $SO_x$ emissions, $NO_x$ emissions, octane number, etc. For example, a three catalyst system, wherein each catalyst can effect a given operating parameter, could be based upon a first injection of a A:B+C catalyst system wherein equal amounts of catalysts B and C are used while the amount of catalyst A is systematically raised during 2, 3, 4, 5, etc. injections of the A:B+C catalyst system. Again, this test technique may be expanded to a A:B+C+D catalyst system, a A:B+C+D+E catalyst system and so on.

Employment of the methods of this patent disclosure normally will begin with the identification of a particular operating characteristic or parameter of an FCC unit that is to be studied, and thereafter influenced during normal operation of that unit. The study will be based upon injection of two or more different catalyst species into the unit, at two or more different times, using two or more relative proportions of the subject catalysts. The two or more different catalysts also should be injected into the unit in a time frame such that the presence of one catalyst will influence the operating parameter under study while the second, third, etc. catalyst is also influencing that same operating parameter. In the more preferred embodiments of this invention, the two (or more) catalysts that influence the same operating parameter will be introduced into the FCC unit more or less contemporaneously. The FCC unit may (or may not) be operating under a given operating parameter limitation at the time of these test injections. For example, such a unit may be operating under a legal limitation (e.g., a 700 ppm $SO_x$ emissions level) but may not be operating under a given technical or economic limitation such as maximization of yield of $C_3$–$C_4$ product to maximize profit.

In any case, during such tests, each catalyst A:catalyst B system (or A:B+C or A:B+C+D, etc. is catalyst system) should be introduced into the FCC unit in an operating characteristic—effecting amount and in at least two different relative proportions or ratios (e.g., 1A:1B, 2A:1B, 1A:2B, etc.). The effect or influence of those two or more catalyst ratio test injections on the operating parameter being studied (e.g., $SO_x$ emissions) are, in some appropriate manner, observed and/or recorded. This information is then used to establish a test response curve for the catalyst ratios versus the operating parameter that is influenced by those two (or more) catalysts.

During subsequent normal operation of the subject FCC unit, the previously selected operating parameter (e.g., $SO_x$ emissions) is monitored. If the operating parameter falls away from a value corresponding to a value associated with the test response curve, the FCC unit is returned to a mode of operation that comports with the mode of operation associated with the test response curve that was established by the initial catalyst injection tests. This return to a desired level of the operating parameter during normal operation of the FCC unit is accomplished by introducing at least one of the two or more catalysts into the FCC unit in an amount such that the catalyst A:catalyst B ratio (the catalyst A: catalyst B+catalyst C, etc. ratio) in the FCC unit is brought to a level that corresponds to, or is associated with, a value lying "on" (or near i.e., within a given tolerance, e.g., ±10%)

the test response curve that was established by the initial testing of the FCC unit.

The concept of a "test response curve" also may be expanded to include a "test response envelope" by use of certain hereinafter described methods. In either case, during subsequent operation of the FCC unit, various amounts of catalyst A, catalyst B, catalyst C, etc., or mixtures of various proportions of catalyst A, catalyst B, catalyst C, etc. can be introduced into the FCC unit in order to bring its operation unto correlation with the test response curve (or test response envelope). In some of the more preferred embodiments of this invention, at least one of the different catalyst species (A and B) will be introduced into the FCC unit to "correct" its operation with respect to the operating parameter in question. In other embodiments of this invention, two or more operating-parameter-effecting catalysts (A, B, C, D, etc.) will be introduced into the unit to make such corrections.

Thus, stated in patent claim terminology, the hereindescribed methods for controlling the operation of a multiple-catalyst-employing FCC unit, will comprise: (1) selecting an operating characteristic of the FCC unit that is affected by each of at least two different catalyst species: catalyst A and catalyst B; (2) injecting an operating characteristic-affecting amount of catalyst A and an operating characteristic-affecting amount of catalyst B into the FCC unit in a first catalyst A:catalyst B test ratio; (3) determining the effect of the first catalyst A:catalyst B test ratio on the operating characteristic in that FCC unit; (4) injecting an operating characteristic-affecting amount of catalyst A and an operating characteristic-affecting amount of catalyst B into the FCC unit in a second catalyst A:catalyst B test ratio that is not the same as the first catalyst A:catalyst B test ratio; (5) determining the effect of the second catalyst A:catalyst B test ratio on the selected operating characteristic of the FCC unit; (6) establishing a unit response curve (or unit response envelope) for the operating characteristic based upon the effect of the first catalyst A:catalyst B test ratio and the second catalyst A:catalyst B test ratio on said operating characteristic; (7) selecting a desired level of the operating characteristic that can be attained by use of a catalyst A:catalyst B system in that FCC unit during its subsequent normal operation (i.e., during "normal" or "real time" production operations); (8) programming a unit response curve (or unit response envelope) based, at least in part, upon the unit response curve (or unit response envelope) established by use of the catalyst test ratios in a CPU unit that controls a catalyst addition system associated with the FCC unit, and (9) injecting at least one of the two catalysts (catalyst A and/or catalyst B) into the multiple-catalyst-employing FCC unit (during subsequent normal operations of said unit) in an amount that brings the active catalyst A:catalyst B ratio in the FCC unit to a level or value that correlates with some point on the unit response curve (or some place in the unit response envelope).

In some more preferred embodiments of this invention, the test response curve (or test response envelope) is established through use of more than two injections of a catalyst A:catalyst B (or catalyst A: catalyst B+catalyst C, etc.) system. More such tests tend to produce more accurate curves (or envelopes). Be that as it may, catalyst A and/or catalyst B, etc. are injected into the FCC unit during subsequent production operations in amounts such that the catalyst A:catalyst B ratio in said FCC unit is brought to a value that correlates to some desired point on the unit response curve (or unit response envelope) for the operating characteristic. The methods by which this can be done, and the advantages obtained by employing such methods, can be better understood by studying the following, more detailed, descriptions and examples of this invention.

DETAILED DESCRIPTION OF THE INVENTION

Figure 1:
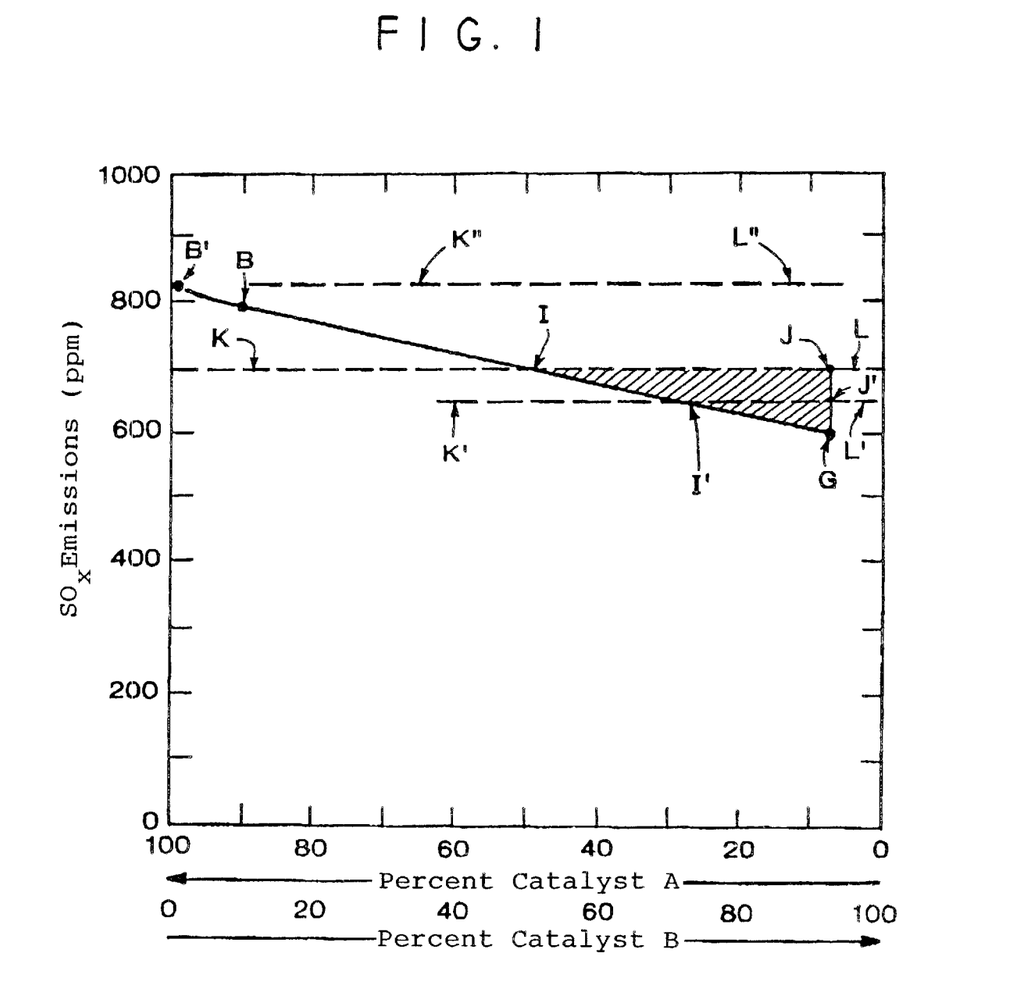

FIG. 1 illustrates a response curve B–G for a representative operating parameter, e.g., $SO_x$ emissions from a FCC unit expressed in parts per million (ppm), relative to the use of various ratios of catalyst A and catalyst B in that FCC unit. Such a curve can be established by injecting operating characteristic—effecting amounts of two different ratios of catalyst A to catalyst B into a FCC unit at two different times and noting the results of those injections on the FCC unit's $SO_x$ emissions. The relative proportions of a catalyst A:catalyst B system are each plotted on the X axis. By way of example only, the catalyst A:catalyst B system used in these tests is assumed to have a total weight of 100 pounds. Again, this 100 pounds has been selected because of the convenient mathematical calculations it provides in applicant's subsequent examples. Generally speaking, the larger the size of the catalyst inventory in a subject FCC unit, the larger the size of the catalyst A:catalyst B test system.

In this case, $SO_x$ emissions are plotted on the Y axis of FIG. 1. Point B, for example, represents the $SO_x$ emissions level (i.e., 800 ppm) achieved by injecting, say, a 100 pound catalyst A and catalyst B test system into a multiple-catalyst-employing FCC unit in amounts such that catalyst A constitutes 90 percent of the total catalyst injected in the first test and catalyst B represents 10 percent of the total catalyst injected in said first test. Again, using 100 pounds of total catalyst as a representative size of the injected catalyst system (i.e., one comprised of catalyst A and catalyst B), such an injection system would be comprised of 90 pounds of catalyst A and 10 pounds of catalyst B. Hence, the catalyst A:catalyst B test ratio for the first test would be 9:1 on a comparative weight basis. Preferably, the amount of each catalyst so injected should be capable of effecting the operating parameter in its own right. The catalyst test system must be capable of influencing the operating characteristic (e.g., $SO_x$ emissions), to a degree that can be detected by a test instrument that is associated with the FCC unit (e.g., an $SO_x$ detector placed in the flue stack of the FCC unit's catalyst regenerator). By way of example only, applicants will assume that at least 10 pounds of catalyst A is needed to effect the $SO_x$ emissions parameter. Similarly, it will be assumed that at least 10 pounds of catalyst B are needed to effect the $SO_x$ emissions of this particular FCC unit.

Point G represents the $SO_x$ emissions level (i.e., 600 ppm) achieved by a second test wherein a total of 100 pounds of a catalyst A:catalyst B test system are again injected into the FCC unit in amounts such that catalyst A constitutes 10 percent (10 pounds) of the total catalyst injected during the second test and catalyst B represents 90 percent (90 pounds) of the total catalyst injected in said second test. Hence, the catalyst A:catalyst B ratio for this second test is 1:9. Again, it is preferred that this second injection be carried out after the effects (or at least a substantial part e.g., at least 60% of the effects) of the first test have worn off.

In any case, a line connecting points B and G can be termed a "test response curve" B–G. Once this curve is programmed into a CPU that controls the FCC unit during normal operations, it might be termed a "unit response curve." In any case, the test response curve or unit response curve is an estimation (based upon two data points B and G) of the ability of a given amount (e.g., 100 pounds) of catalyst A and catalyst B to influence the selected process parameter (i.e., $SO_x$ emissions) of the subject FCC unit.

Line K–L of FIG. 1 depicts a desired level for the subject operating parameter (i.e., $SO_x$ emissions). This desired level could be based on a technical characteristic, or an economic goal, or a legally mandated environmental requirement. By way of example only, line K–L is shown drawn at a $SO_x$ emissions level of 700 ppm. This level, for example, might be imposed by some governmental regulation. Thus, the line K–L may be regarded as a "desired," predetermined, limiting value of an operating characteristic of the unit—again, such as the maximum permissible $SO_x$ emissions level. Line K–L is shown intersecting the unit response curve B–G at a point I. Hence, the lines created by this combination of factors is such that the FCC unit can be thought of as being legally operated along the unit response curve B–G anywhere between point I and point G.

FIG. 1 also depicts a point J on line K–L that lies directly above point G. If points G and J are connected by a line G–J a triangular region I–G–J–I is created. This triangular region is shown cross-hatched in FIG. 1. This triangular region represents what may be termed a "unit response envelope" that is created by the interplay of the technical capability of a catalyst A:catalyst B system to establish $SO_x$ emissions levels in this particular FCC unit, and a desired or mandated limit (e.g., a 700 ppm $SO_x$ emissions level) assumed in this particular example. Consequently, the FCC unit need not be operated exactly along line I–G to be in compliance with the $SO_x$ emission regulation. Rather, the unit can be operated anywhere in the unit response envelope I–G–J–I and still be in "compliance" with the $SO_x$ emission regulation. Obviously, in operating a FCC unit, the leeway to operate in a region such as unit response envelope I–G–J–I, as opposed to operating along a line such as line I–G, is of great practical value. In effect, the unit response envelope I–G–J–I presents a much larger "target" than the I–G portion of the unit response curve B–I–G.

Next it should be noted that point I corresponds with a catalyst A:catalyst B system wherein catalyst A is roughly 50 percent (e.g., 50 pounds) of the catalyst A:catalyst B system used in this test injection while catalyst B, likewise, is roughly 50 percent (e.g., 50 pounds) of that catalyst system. The catalyst A:catalyst B ratio at point I is therefore about 1:1. Again, point G is achieved by injection of 10 pounds of catalyst A and 90 pounds of catalyst B. Thus, the FCC unit may be legally operated through use of a FCC catalyst A:catalyst B ratio ranging from 1:1 to 1:9.

Based upon this knowledge of the position and shape of the test response curve (and, hence, the unit response curve (or unit response envelope) it generates, the plant operator, during subsequent normal operation of the unit, can employ any ratio of catalyst A:catalyst B (of an assumed injection amount, such as 100 pounds) that places the subject operating parameter ($SO_x$ emissions) along (or near) line I–G (or in unit response envelope I–G–J–I). Therefore, for the purposes of this patent disclosure, operation "along" a unit response curve such as line I–G may be, in some cases, regarded as being equivalent to operating "within" a unit response envelope such as I–G–J–I that is at least partially established by a portion of that response curve (e.g., line I–G is the hypotenuse of triangle I–G–J). Obviously, any desired "tolerance" (within 5%, 10%, etc.) with respect to any such line B–G or operating envelope I–G–J–I can likewise be programmed into the CPU. In any case, the test response information and 700 ppm $SO_x$ emissions limitation will be used by programming them into a CPU that controls the addition of catalyst A and (independently and/or simultaneously) controls the addition of catalyst B into said FCC unit. In other words, it is assumed that the separate additions from two (or more) catalyst hoppers that feed the FCC unit can be controlled by one, commonly used, CPU.

In the case depicted in FIG. 1, operation along line I–G (or within envelope I–G–J–I) can be achieved by any catalyst A:catalyst B system wherein catalyst A constitutes from about 50 percent to about 10 percent of the catalyst system, and catalyst B constitutes from about 50 percent to about 90 percent of the total catalyst. In other words, this range of operation can be achieved by catalyst A:catalyst B ratios in the FCC unit ranging from 1:1 to 1:9.

It also should be appreciated that the unit response curve B–G that was established by the test injections of catalyst A and catalyst B can again be employed in a different computer program if a limit on a parameter such as the 700 ppm $SO_x$ emissions limitation is changed. Suppose, for example, a new governmental regulation lowers the $SO_x$ emissions level from 700 ppm to 650 ppm. This 650 ppm limitation can be programmed into the unit's CPU. This limitation is depicted by line K'–L' in FIG. 1. It is shown intersecting line B–G at point I'. This implies that, if the new $SO_x$ limitation is 650 ppm, the FCC unit can be operated anywhere along line I'–G, or anywhere in the newly established unit response envelope (I'–G–J'–I'). In order to be most useful, the new limit line K'–L' should intersect line B–G somewhere between point B (which, again, was established by a 90:10 catalyst A:catalyst B ratio injection test) and point G (which, again, was established by a 10:90 catalyst A:catalyst B ratio injection test). This is not to say that a unit response curve such as B–G can not be extrapolated to a new point (such as point B') and then considered with respect to new relevant limitation line, such as line K"–L", which is shown in FIG. 1 as representing a $SO_x$ emissions level of about 825 ppm. Again, however, it is preferred that the new limitation line (e.g., line K'–L') intersect the curve B–G that was established by the original test injections (i.e., line B–G).

Once armed with a knowledge of the extent of these unit response curves (and unit response envelopes), the plant operator can then look to any "secondary" considerations that also may be in play with respect to operation of the FCC unit. These secondary considerations may be economic, technical and/or legal in nature. Suppose for example that catalyst A and catalyst B both cost the same (e.g., $1.00 per pound). In this case "all other things being equal" a plant operator could be indifferent as to what catalyst A:catalyst B ratio between 1:1 (produced by a 50% catalyst A, 50% catalyst B system) and 1:9 (produced by a 10% catalyst A, 90% catalyst B system) was employed, so long as the FCC unit operates within the I–G–J–I unit response envelope generally defined by the technical capabilities of the catalyst A:catalyst B system (depicted by line I–G) and by the legal constraint (indicated by the I–J portion of the 700 ppm $SO_x$ emissions level depicted by line K–L). If on the other hand catalyst B costs more (e.g., $2.00 per pound) than catalyst A (e.g., $1.00 per pound), then the plant operator, all other things being equal, would prefer to operate the process at or near point I in order to use less of the relatively more expensive catalyst (i.e., $2.00 per pound, catalyst B).

At this point, another degree of freedom with respect to the most economical operation of this FCC unit also might be considered. This degree of freedom is the absolute amount of catalyst being used by the FCC unit during any given injection of a catalyst A:catalyst B system—especially during normal operation of the unit. Let us assume, for example, that the test curve B–I–G was established by adding a total of 100 lbs (over a given time span, e.g., over one hour, one day, etc.) of a catalyst A:catalyst B system to the FCC unit in each of two separate tests. Again, in the test that produced point B, 90 lbs of catalyst A and 10 lbs of catalyst B were added. Again, point G was produced by use of a test injection of 10 lbs of catalyst A and 90 lbs of catalyst B.

Figure 2:
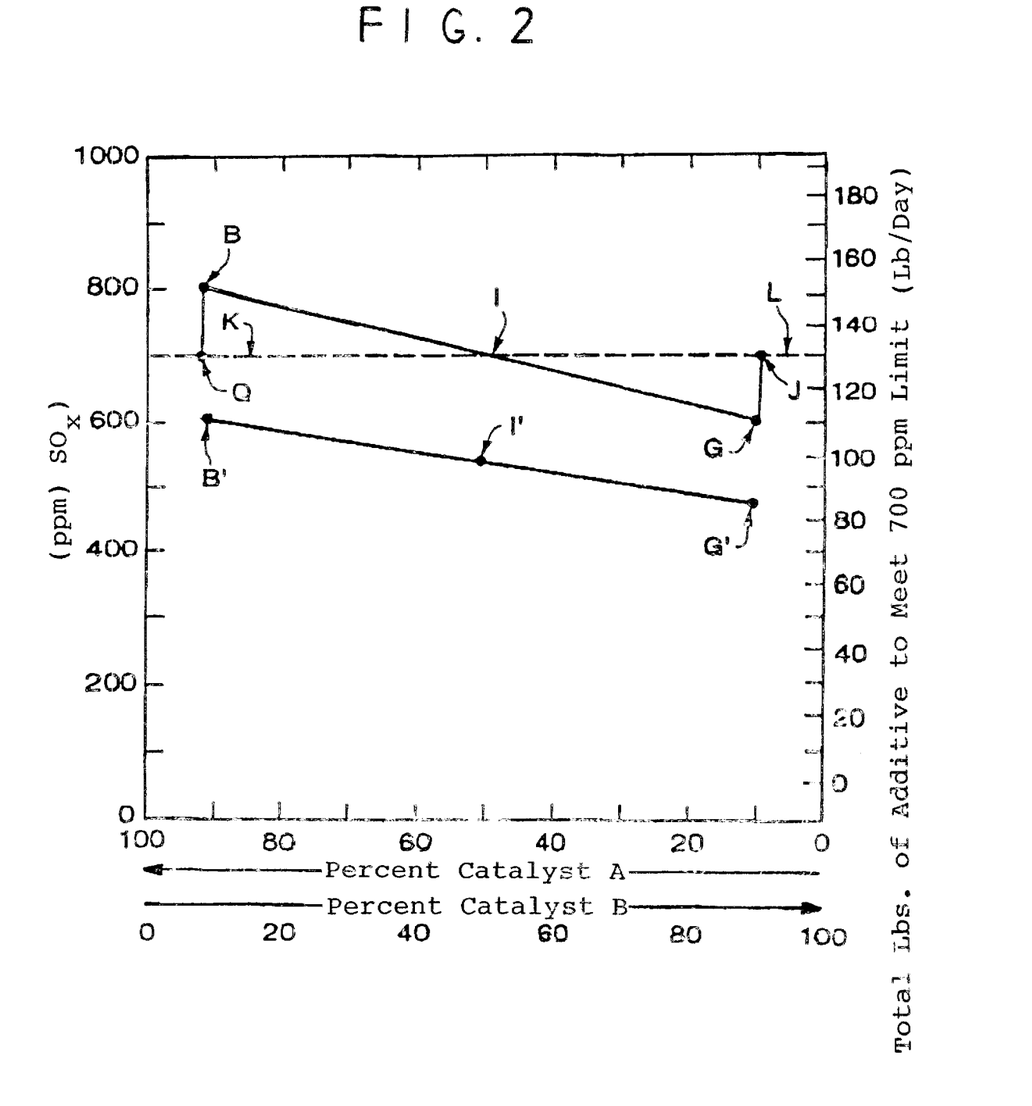

Now, if one assumes that a secondary objective of the subsequent normal or real time operation of this FCC unit is to bring its $SO_x$ emissions level to as close to the legally mandated 700 ppm level as possible, the opportunity to lower the overall cost of operating the FCC unit presents itself. If, for example, the unit's $SO_x$ emission level is below the legal level (i.e., below 700 ppm), the plant operator is in fact adding "too much" additive, and hence spending too much money. This opportunity to lower the overall cost of meeting the mandated 700 ppm $SO_x$ emission level is depicted in FIG. 2 wherein the relative proportions of catalyst A:catalyst B are again plotted on the X axis and the $SO_x$ emissions are again plotted on the left Y axis. FIG. 2 also has a right hand Y axis which shows the total pounds of catalyst (expressed in pounds/day) that are needed to meet the mandated 700 ppm $SO_x$ emission level. The upper curve (B–I–G) of FIG. 2 describes the $SO_x$ emissions at each of the three representative catalyst A:catalyst B ratios used herein (i.e., 10:90, 50:50 and 90:10 ) when 100 lbs per unit time (e.g., per day) of a catalyst A:catalyst B mixture is used as the injected amount.

This curve B–I–G indicates that, if the operator chooses to add a 10:90 ratio catalyst system, adding 100 lbs per day will take the FCC unit to point G where the FCC unit's $SO_x$ emissions level is about 600 ppm—well below the mandated 700 ppm level. Referring now to the lower curve (B'–I'G') of FIG. 2, we see that it has the same length as its counterpart upper curve (B–I–G). Again, this curve is associated with the right hand, Y axis which is denominated in total pounds per day (Lb/day) of additive needed to meet the 700 ppm limit. For example, point I' is shown corresponding with the 100 pounds per day level of the right hand, Y axis. Point B' corresponds with a right Y axis value of about 114.28 pounds per day. Point G' corresponds with a right Y axis value of about 85.71 pounds per day. In other words, at point B', 100 lbs/day of the 90:10, catalyst A:catalyst B, test injection produced a $SO_x$ emissions level of 800 ppm. Consequently, the total amount of this 90:10 catalyst A:catalyst B mixture that is needed to produce the legally mandated 700 ppm level will be about 114.28 lbs/day (i.e., 100 lbs/day×800/700=114.28 lbs/day). Similarly, at point G', 100 lbs/day of a 10:90, catalyst A:catalyst B, injection system produced a $SO_x$ emission level of 600 ppm. Thus, the total amount of this 10:90 catalyst A:catalyst B system needed to produce the legally mandated 700 ppm level will be about 85.71 lbs/day (i.e., 100 lbs/day×600/700=85.71 lbs/day).

Those skilled in this art will appreciate that the calculations given in this patent disclosure are in rather simplistic forms. Such simplified forms are used to generally demonstrate applicant's catalyst concentration adjustment concepts rather precisely calculating the exact amount of additive(s) required for a given change in concentration at any given level of operation. In commercial operations, much more detailed and rigorous calculations will be performed by computers using programs that repeatedly reiterate and refine such calculations as new operating, cost or legal information becomes available.

In any case, knowing such relationships (and entering them into a CPU that controls the FCC unit's catalyst addition system), the plant operator has, during subsequent operation of said FCC unit, the freedom to reduce the amount of a 10:90 catalyst A:catalyst B system to about 85.71 lbs per day, and still operate at a point that correlates with point J in FIG. 2. This follows from the fact that point J lies on the legally mandated 700 ppm $SO_x$ emissions line K–L. In other words, the plant operator can meet the 700 ppm $SO_x$ emissions level using 85.71 pounds (rather than 100 pounds) of the 10:90 catalyst A:catalyst B system.

Figure 3:
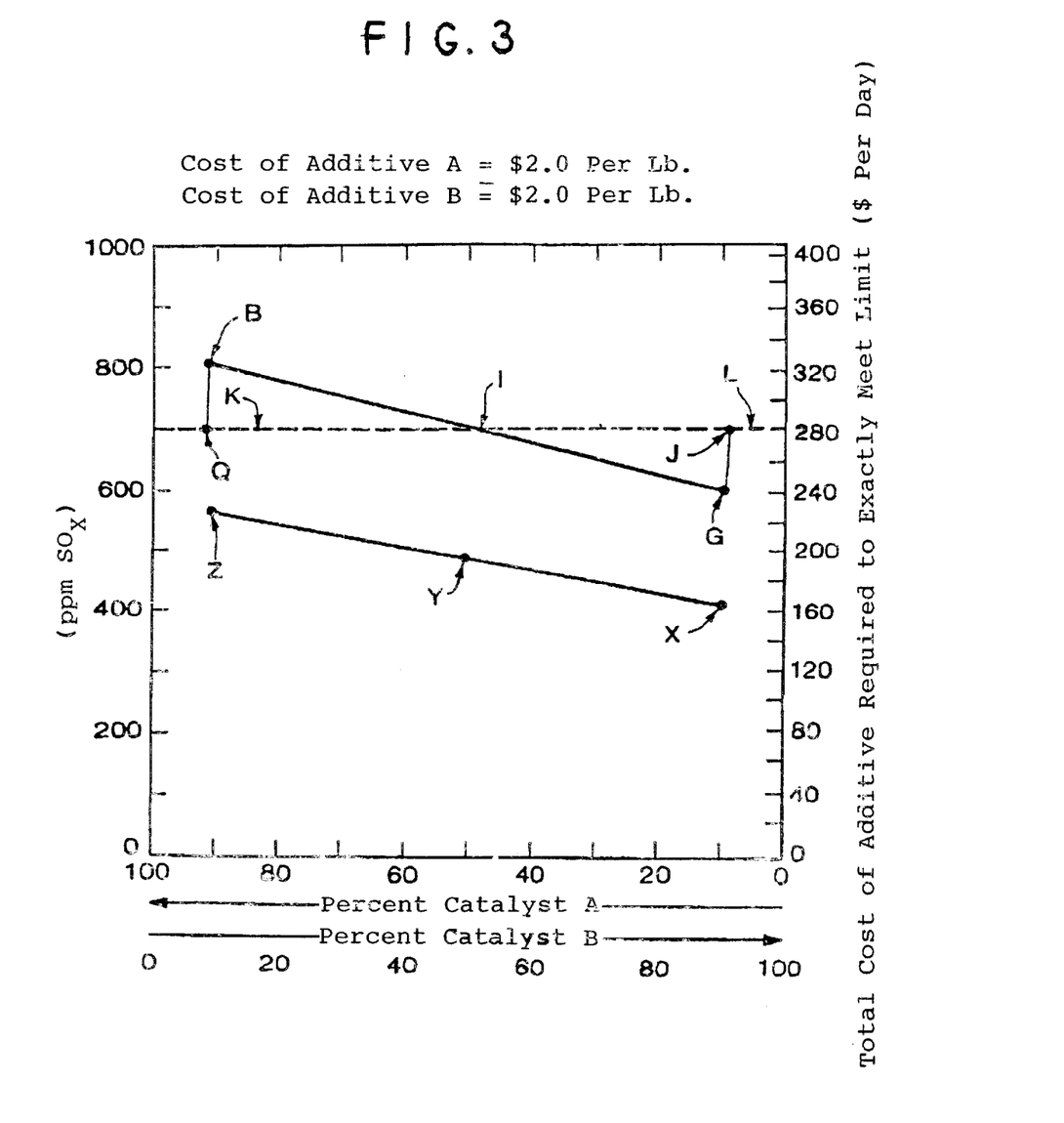

By assuming various costs for the two catalysts, i.e., catalyst A and catalyst B, the plant operator can consider the economic consequences of using various amounts of each catalyst. If, for example, both catalyst A and catalyst B cost $2 per lb, then the cost of achieving a 700 ppm $So_2$ emissions limit can be depicted in the manner shown in FIG. 3. Here, one finds that the cost of operating at point Q on line K–L is about $228 per day. This correlates with point Z on curve Z–Y–X which, in turn, is correlated with the right hand ($/day), Y axis of FIG. 3. This cost is obtained by multiplying the amount of each catalyst species used in lbs/day by the cost of each catalyst in $/lb. In this example, about 102.85 lbs/day (114.28 lbs/day×0.9) of catalyst A and about 11.42 lbs/day (114.28×0.1) of catalyst B comprise the 114.28 pounds of total catalyst needed to operate at point Z. Again, point Z correlates with point Q on the 700 ppm legal limit line K–L. Consequently, if each catalyst costs $2/lb, then the total cost of the 114.28 pounds of total catalyst is about $228 (102.85 lbs catalyst A×$2.00 /lb plus 11.42 lbs catalyst B×$2/lb). In the same way, the cost of operating at point I can be calculated to be $200 per day as indicated point Y on curve Z–Y–X (i.e., 50 lbs/day of catalyst A at $2/lb plus 50 lbs/day catalyst B at $2/lb). Similarly, the cost of operating at point X is $172 per day. In this example, about 8.6 lbs/day (85.71 lbs/day×0.1) of catalyst A and about 77.4 lbs/day (85.71 lbs/day×0.9) of catalyst B comprise the 85.71 pounds of total catalyst needed to operate at point X on line Z–Y–X. Point X correlates with point J on the 700 ppm $SO_x$ limit line K–L. Therefore, if each catalyst costs $2/lb, then the total cost of the approximately 86 pounds of total catalyst is $172 (i.e., 8.6 lbs catalyst A×$2/lb plus 77.4 lbs catalyst B×$2/lb). Therefore, in this case, the lowest cost option for the plant operator is at point X, which is attained a total catalyst cost of about $172 per day.

Figure 4:
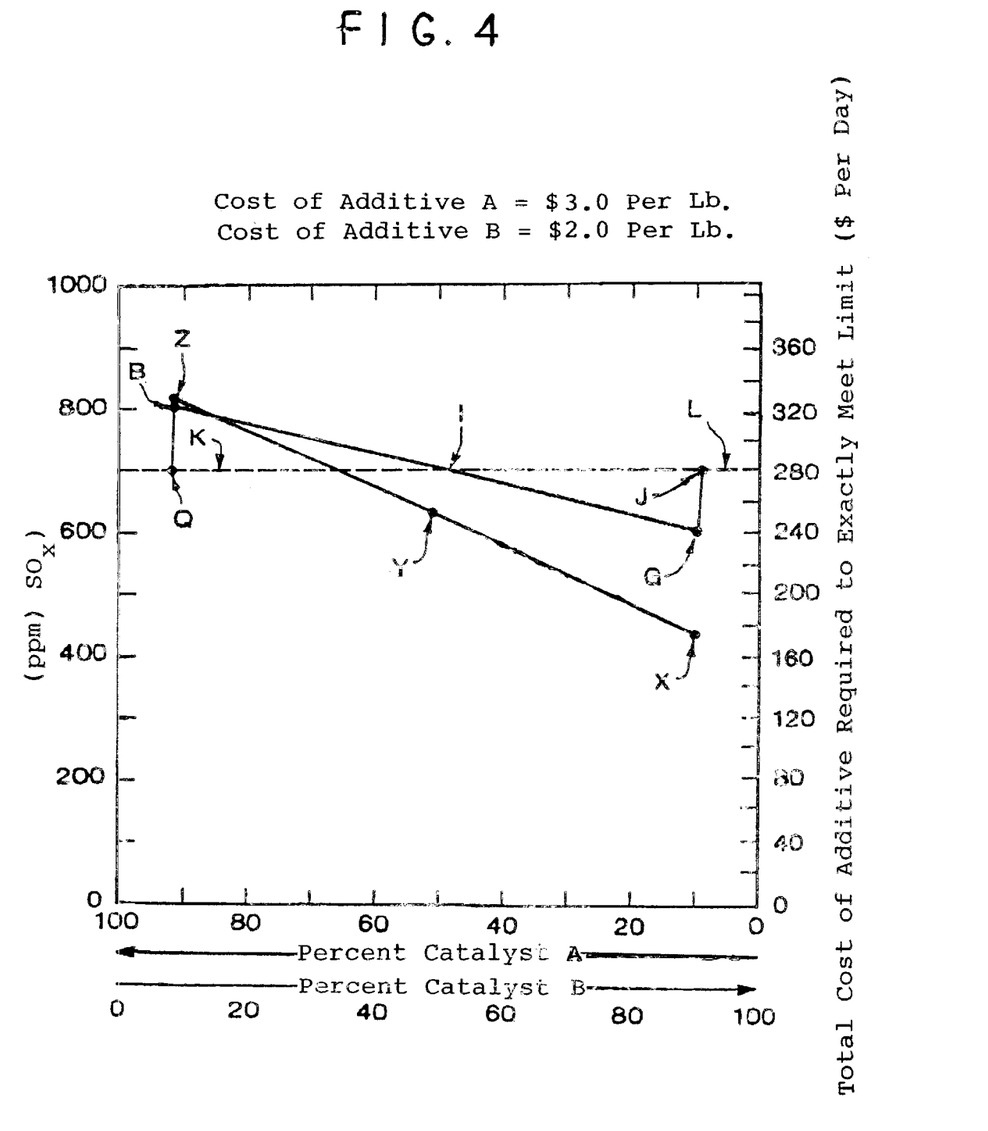

If catalyst A costs $3 per lb, and catalyst B costs $2 per lb, the cost of achieving the mandated 700 ppm $SO_2$ emission level can again be plotted against another right Y axis, as shown in FIG. 4.

In this example, 102.85 lbs/day of catalyst A, costing $3/lb, and 11.42 lbs/day of catalyst B, costing $2/lb are employed at point Z. Thus, the total cost of operating at point Z is $330.60 per day. This corresponds with point Q on 700 ppm line K–L. The cost of operating at point Y is $250 per day. That is to say 50 lbs of catalyst A priced at $3/lb, and 50 lbs of catalyst B, priced at $2/lb, are employed. The cost of operating at point X is $180.60 per day. Here 8.6 lbs/day costing $3/lb, and 77.4 lbs/day of catalyst B, costing $2/lb, are employed. Thus, in this case, the lowest cost option for the plant operator is found at point X.

Figure 5:
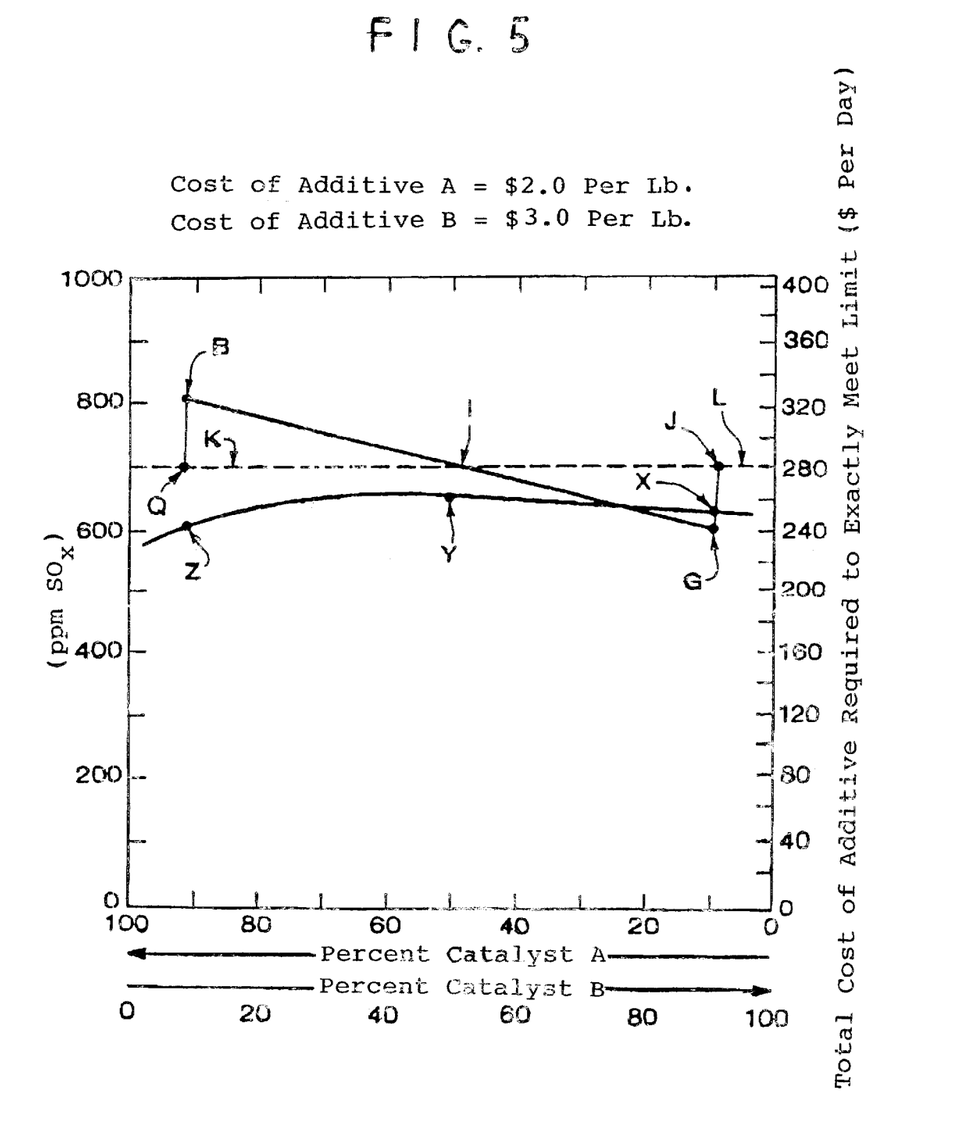

If catalyst A costs $2 per lb, and catalyst B costs $3 per lb, then the cost of achieving the mandated 700 ppm $SO_2$ emission level can again be plotted against another right hand, Y axis such as the one shown in FIG. 5. Here, we find that the cost of operating at point Z is $239.40 per day. The cost of operating at point Y is $250 per day. The cost of operating at point X is $249.40 per day. Thus, in this case, the lowest cost option for the plant operator is to operate at point Z, or $239.40 per day. This is the lowest total cost level, even though the plant operator must add more total lbs per day of additive to stay at the 700 ppm $SO_x$ emissions limit. Notice also that the X–Y–Z curve has its highest point at point Y. This implies that the most uneconomical place to operate under these cost circumstances is at point Y.

Thus having described how a refiner (via a CPU control unit) can use the catalyst A:catalyst B addition test results to obtain the most economical real time operating costs, we will now describe how another secondary consideration, e.g., of a technical nature, also may be considered in the operation of this FCC process. Let us assume for example that this catalyst A:catalyst B system also has an effect on the $NO_x$ emissions from this FCC unit and that this effect is generally depicted by the $NO_x$ response curve M–N shown in FIG. 6. This curve is depicted as being linear in nature, but could also have a curved configuration. The values of this $NO_x$ response curve are referenced to a right hand, Y axis, wherein $NO_x$ emission levels are expressed in parts per million (ppm). The direction and slope of $NO_x$ response curve M–N indicates that catalyst A:catalyst B systems having higher concentrations of catalyst A are more effective in reducing $NO_x$ emissions. For example, the $NO_x$ response curve M–N indicates that a catalyst A:catalyst B system comprised of about 90% catalyst A and 10% catalyst B produces a $NO_x$ emission level of about 300 ppm while a system comprised of 10% catalyst A and 90% catalyst B produces a $NO_x$ emission level of about 800 ppm.

Let us now assume that there is a legally mandated $NO_x$ emission level of 650 ppm. This level is depicted by line Q–R in FIG. 6. Thus, the subject FCC unit must be operated below the 650 ppm $NO_x$ level depicted by line Q–R, as well as below the 700 ppm $SO_x$ level depicted by line K–L. All of the facts and circumstances associated with the $NO_x$ emissions of this FCC unit, likewise, can be entered into a CPU associated with said unit (e.g., the CPU used to monitor and control $SO_x$ emissions). Moving on with this description of FIG. 6, we see that line O–O' also intersects line G–I at point S. Given this additional restraint upon the operation of the FCC unit, not only must the unit be operated in the $SO_x$ emissions operating envelope I–G–J–I, it also must be operated within a $NO_x$ "secondary" envelope Q–M–O. It also can be seen in FIG. 6 that, in order to do this, the catalyst A:catalyst B system must be such that catalyst A constitutes from about 50 percent to about 35 percent of the catalyst system while catalyst B constitutes from about 50 percent to about 65 percent of the catalyst system. Thus in order to simultaneously meet both the $SO_x$ and the $NO_x$ limitations the catalyst A:catalyst B ratio can range from 50:50 (at point I) to 35:65 (at point O).

Figure 6:
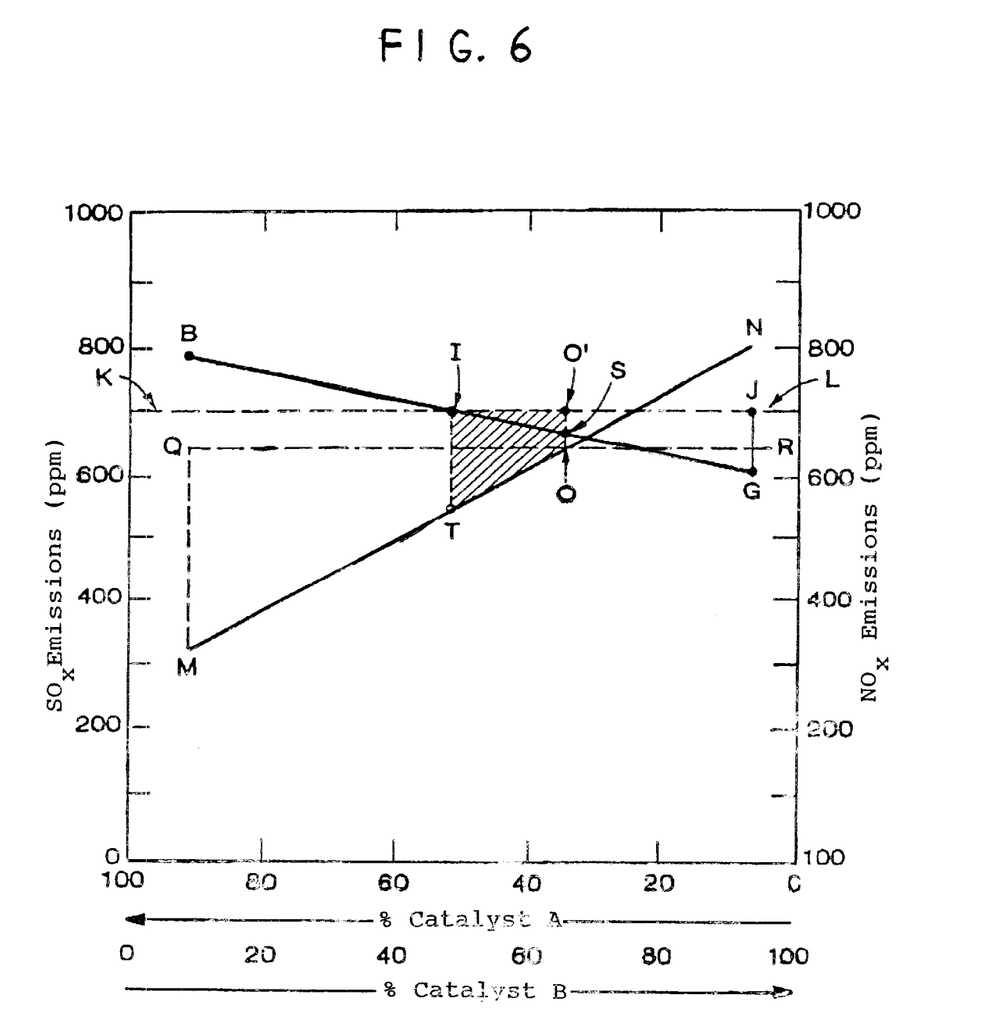

Here again, if catalyst A and catalyst B both cost the same ($1.00 per pound) the plant operator, all other things being equal, would feel free to operate the FCC unit anywhere along line T–O or, indeed, anywhere within secondary envelope T–O–O'–I. If, however, catalyst A costs less (e.g., $1.00 per pound) than catalyst B (e.g., $2.00 per pound), the plant operator, nonetheless, would have to use a catalyst A:catalyst B system that has at least 50% catalyst B (which again, corresponds, at point I, with a catalyst B concentration of 50 percent) regardless of the fact that catalyst A costs only half as much as catalyst B. In other words, all other things being equal, the plant operator would be inclined to operate the FCC unit nearer to point I than nearer to point O in order to substitute the relatively less expensive (i.e., $1.00 per pound) catalyst A for the relatively more expensive (i.e., $2.00 per pound) catalyst B in the 100 pound test system.

And, as in the previously described method for lowering the overall cost of meeting the 700 ppm $SO_x$ emissions level that was described in conjunction with FIG. 2, the overall cost of meeting the 650 ppm $NO_x$ emission level can be lowered by, for example, operating the FCC midway between points O and T in order to use less than 100 pounds of the catalyst A:catalyst B mixture.

Figure 7:
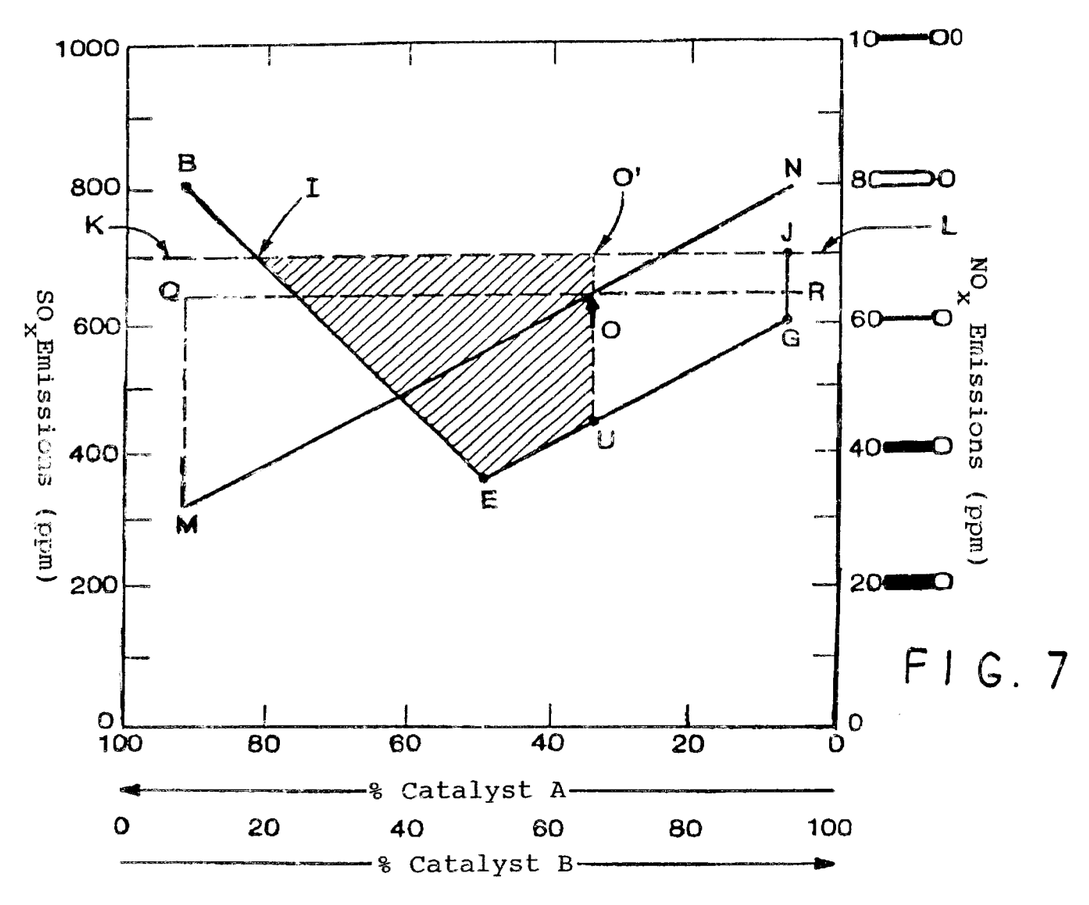

FIG. 7 depicts an operating curve for $SO_x$ emissions based upon test injections of three different ratios of catalyst A:catalyst B at three different times. In FIG. 7, point B corresponds to the catalyst A:catalyst B system that was previously described with respect to FIG. 1 (i.e., point B is created by a catalyst A:catalyst B system comprised of 90% catalyst A and 10% catalyst B). Similarly, point G again corresponds to a system having 10% catalyst A and 90% catalyst B. FIG. 7, however, also depicts a third data point, E. This third data point E was obtained by injection of a catalyst A:catalyst B system comprised of about 50 percent catalyst A and about 50 percent catalyst B. The knowledge provided by this third data point serves to greatly expand the area of the unit response envelope. Thus, if line K–L of FIG. 7 once more depicts a legally mandated 700 ppm $SO_x$ emissions level, then the $SO_x$ emissions unit response envelope is now bounded by line I–E, line E–G, line G–J and line J–I. Again, this envelope I–E–G–J–I is much larger than the unit response envelope I–G–J–I depicted in FIG. 1.

If one again assumes catalyst A and catalyst B cost the same (e.g., catalyst A costs $1.00 per pound and catalyst B also costs $1.00 per pound), then the plant operator, all other things being equal, will use a catalyst A:catalyst B system whose catalyst A component is from about 84 percent catalyst A and about 16 percent catalyst B (corresponding to point I) to about 10 percent catalyst A and about 90 percent catalyst B (corresponding to point G). If however, catalyst A is less expensive (e.g., $1.00 per pound) than catalyst B (e.g., $2.00 per pound) than the plant operator will substitute catalyst A for catalyst B and operate as near to point I as possible in order to stay at or below the legally mandated 700 ppm $SO_x$ level at the lowest possible catalyst A:catalyst B system cost.

If the 650 ppm $NO_x$ limitation is again taken into consideration, the operator's catalyst ratio leeway is once more cut down considerably. In effect, since the $NO_x$ emissions curve M–N for the catalyst A:catalyst B system intersects line Q–R at point O, the "secondary," $NO_x$ envelope in which the unit can be operated becomes I–E–U–O'–I. Thus, regardless of the relative costs of the two catalyst species, the catalyst A:catalyst B system must be comprised of at least about 35 percent catalyst A and about 65 percent catalyst B (corresponding to the relative concentrations of these two catalyst at point O) in order to meet the $NO_x$ emission standard as well as the $SO_x$ emission standard. Similarly, in order to meet the $NO_x$ limitation as well as the $SO_x$ limitation a catalyst A:catalyst B system having no more than 84 percent catalyst A and no less than 16 percent catalyst B (see the position of point I in FIG. 7) would have to be employed regardless of their relative costs.

Figure 8:
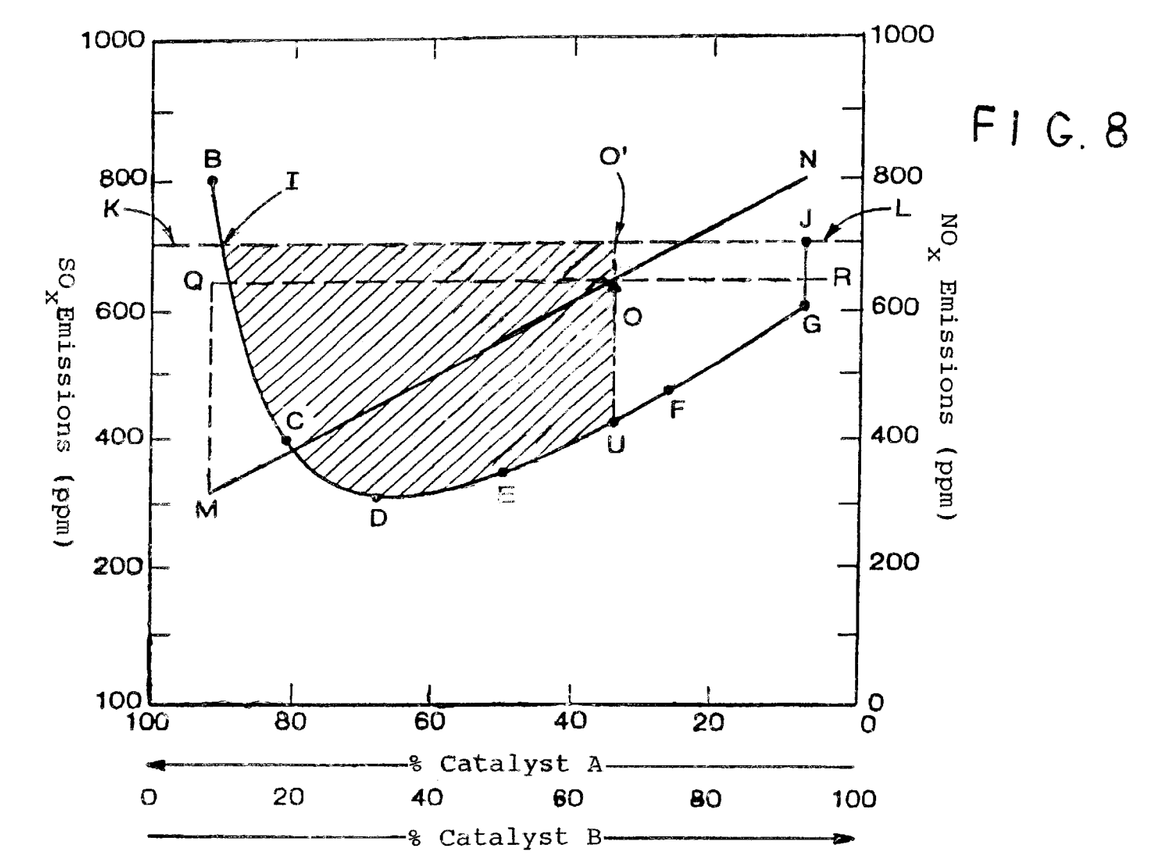

FIG. 8 depicts the shape of an $SO_x$ emissions response curve that is created by six data points B, C, D, E, F and G. That is to say, six different ratios of catalyst A:catalyst B were injected into the FCC unit at six different times in order to establish this unit response curve. The approximate catalyst A:catalyst B percentages of these data points are B (90:10 ), C (88:12), D (65:35), E (52:48), F (26:74) and G (10:90 ). In effect, the data obtained by injecting these six different ratios of catalyst A:catalyst B into a given FCC unit expands the size of the operating envelope to a region that approximates its largest size. Taking into consideration the 700 ppm $SO_x$ limitation, the $SO_x$ emissions envelope is the region bounded by the lines that connect points I–C–D–E–F––G–J–I.

Therefore, all other things being the same, if the FCC unit operator simply wanted to stay in compliance with the 700 ppm $SO_x$ emission limit, a catalyst A:catalyst B system having catalyst A:catalyst B percentages ranging from I(85:15) to G(10:90) could be employed. If the plant operator wanted to achieve the lowest $SO_x$ emissions possible with a catalyst A:catalyst B system, and if catalyst A and catalyst B cost the same, the operator would employ about a 65 percent catalyst A:35 percent catalyst B system in order to operate the process near the lowest known point (point D) of the operating envelope. If on the other hand catalyst A costs $1.00 per pound and catalyst B costs $2.00 per pound, the operator, all other things being equal, would want to operate near point I which represents a 85 percent catalyst A:15 percent catalyst B system. In effect, FIGS. 2 and 3 could be created for this new catalyst cost situation and then determine the lowest cost point of operation.

The secondary envelope for $NO_x$ emissions (taking into account the 650 ppm legal limit depicted by line Q–R) in FIG. 8 is bounded by the lines that connect points Q–M–O. Thus, if the operator wanted to comply with both the $SO_x$ emission standard and the $NO_x$ emission standard, a catalyst A:catalyst B system having no more than about 85 percent catalyst A would be employed. The location of point O (and point O') indicates that the catalyst A:catalyst B system must have at least about 35 percent catalyst A and no more than about 65 percent catalyst B. Here again, if catalyst A and catalyst B were equally priced the operator could employ catalyst A:catalyst B systems containing from about 35 percent to about 85 percent catalyst A. And as before, if catalyst B were more expensive than catalyst A, it would be more economical to operate the FCC unit as close to point I as possible. And, here again, use of less than 100 pounds of a given catalyst ratio system can still achieve the legal $NO_x$ level of 650 ppm. For example, less than 100 pounds of catalyst can be used by operating the FCC unit at point D rather than at point O. Here again, re-plotting FIGS. 2 and 3 under this new cost situation will enable the operator (through the FCC unit's CPU) to determine the lowest cost point of operation for the FCC unit.

Figure 9:
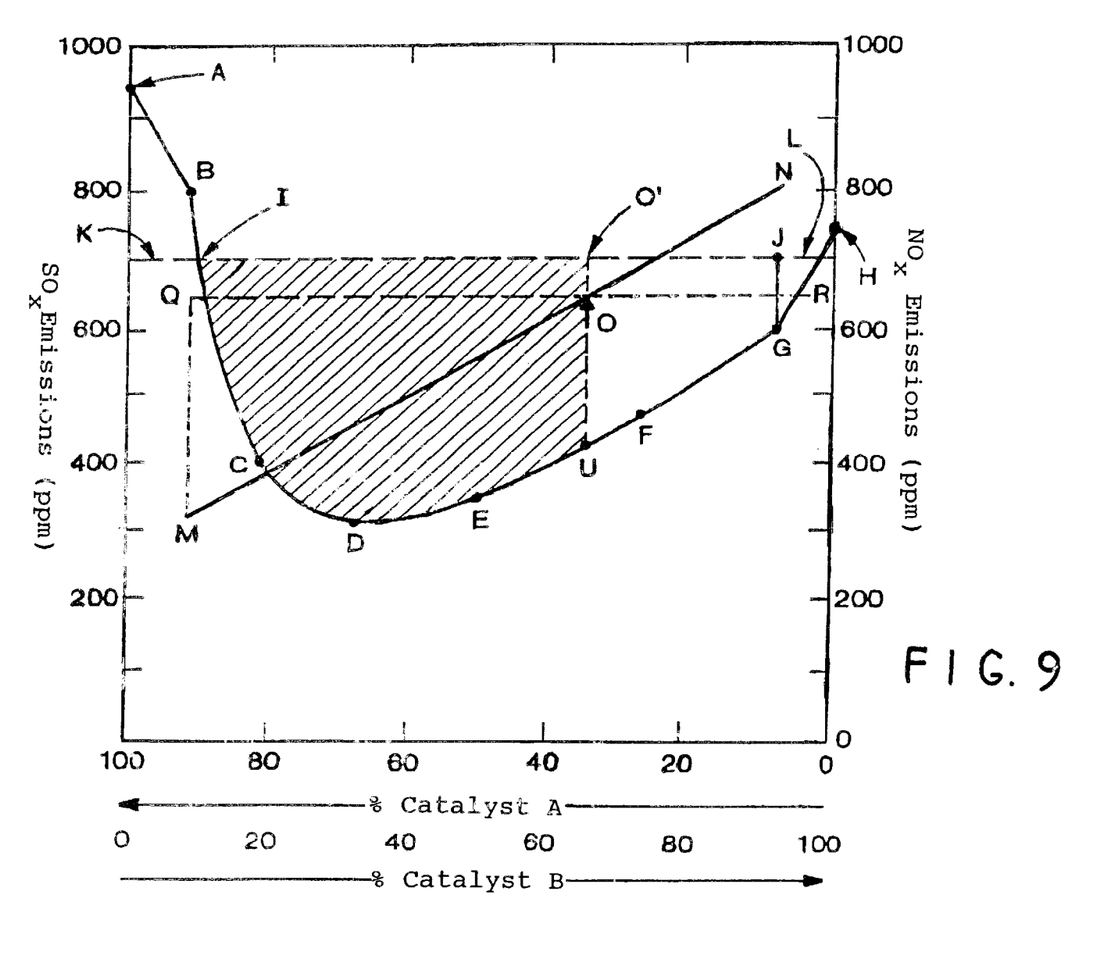

FIG. 9 depicts a special case where the catalyst A:catalyst B system is shown including data points A and H which respectively correspond to catalyst additive systems wherein, at point A, catalyst A is 100 percent of the additive system and catalyst B is 0 percent of the catalyst "system." At point H, catalyst B is 100 percent of the additive system and catalyst A is 0 percent of that additive system. Point A corresponds to a 950 ppm $SO_x$ emission level and point H corresponds to a 750 ppm $SO_x$ emission level. Again, these cases are rather trivial since the hereindescribed test methods should employ at least two catalyst species and since we have postulated that at least 10 pounds of each of the two catalyst species are needed to effect the $SO_x$ emissions level.

Those skilled in this art will appreciate that other embodiments of this invention will be produced by considering the effects of other catalyst systems on these, or on other operating parameters (e.g., $CO_2$ emission, product yield, $NO_x$ emissions, CO combustion, gasoline sulfur reduction, olefin product make, olefin product structures, vanadium reduction, $CO_2$ production, etc.). And, in such cases, three, four, etc. different catalysts species (and many more multiple test points) again could be used when considering any such operating parameters. Therefore, this invention should be limited only by the most generalized forms of the following claims.

We claim:

1. A method for controlling operation of a multiple-catalyst-employing FCC unit, said method comprising:

(1) selecting an operating characteristic of the multiple-catalyst-employing FCC unit that is affected by each of at least two different catalyst species: catalyst A and catalyst B;

(2) injecting an operating characteristic-affecting amount of catalyst A and an operating characteristic-affecting amount of catalyst B into the multiple-catalyst-employing FCC unit in a first catalyst A:catalyst B test ratio;

(3) determining the effect of the first catalyst A:catalyst B test ratio on the operating characteristic;

(4) injecting an operating characteristic-affecting amount of catalyst A and an operating characteristic-affecting amount of catalyst B into the multiple-catalyst-employing FCC unit in a second catalyst A:catalyst B test ratio that is not the same as the first catalyst A:catalyst B test ratio;

(5) determining the effect of the second catalyst A:catalyst B test ratio on the operating characteristic;

(6) establishing a unit response curve for the operating characteristic based, at least in part, upon the effect of the first catalyst A:catalyst B test ratio and the second catalyst A:catalyst B test ratio on said operating characteristic;

(7) selecting a desired level of the operating characteristic that can be attained by the multiple-catalyst-employing FCC unit by some catalyst A:catalyst B ratio;

(8) programming a unit response curve in a central processing unit that controls a catalyst addition system associated with the FCC unit; and (9) injecting at least one of the two catalysts (catalyst A or catalyst B) into the multiple-catalyst-employing FCC unit during subsequent normal operation of said unit in an amount that brings the catalyst A:catalyst B ratio in the unit to a value that correlates with a point on the unit response curve.

2. The process of claim 1 wherein the at least two different catalyst species are each stored in, and supplied by, a separate catalyst addition system.

3. The process of claim 1 wherein the unit response curve is established through use of three or more injections of three or more different catalyst A:catalyst B test ratios.

4. The process of claim 1 wherein more than two catalyst species are tested in the FCC unit.

5. The process of claim 1 wherein more than two catalyst species are each stored in, and supplied by, a separate catalyst addition system.

6. The process of claim 1 wherein operating parameter is selected from the group consisting of $SO_x$ emissions, $NO_x$ emissions, CO combustion, gasoline sulfur reduction, olefin product make, olefin product molecular structure, vanadium reduction and $CO_2$ production.

7. The method of claim 1 wherein the operating parameter is the $SO_x$ emissions level of the FCC unit.

8. The method of claim 1, wherein catalyst A and the second catalyst B are each $SO_x$ removal catalysts.

9. A method for controlling operation of a multiple-catalyst-employing FCC unit, said method comprising:

(1) selecting an operating characteristic of the multiple-catalyst-employing FCC unit that is effected by each of at least two different catalyst species: catalyst A and catalyst B;

(2) injecting an operating characteristic-affecting amount of catalyst A and an operating characteristic-affecting amount of catalyst B into the multiple-catalyst-employing FCC unit in a first catalyst A:catalyst B test ratio;

(3) determining the effect of the first catalyst A:catalyst B test ratio on the operating characteristic;

(4) injecting an operating characteristic-affecting amount of catalyst A and an operating characteristic-affecting amount of catalyst B into the multiple-catalyst-employing FCC unit in a second catalyst A:catalyst B test ratio that is not the same as the first catalyst A:catalyst B test ratio;

(5) determining the effect of the second catalyst A:catalyst B test ratio on the operating characteristic;

(6) establishing a unit response curve for the operating characteristic based, at least in part, upon the effect of the first catalyst A:catalyst B test ratio and the second catalyst A:catalyst B test ratio on said operating parameter;

(7) selecting a desired level of the operating characteristic that can be attained by the multiple-catalyst-employing FCC unit by some catalyst A:catalyst B ratio;

(8) defining an operating envelope for the FCC unit through use of the response curve and a desired level of the operating characteristic;

(9) programming a unit response envelope in a central processing unit that controls a catalyst addition system associated with the FCC unit; and (10) injecting at least one of the two catalysts into the multiple-catalyst-employing FCC unit during subsequent normal operation of said unit in an amount that brings the catalyst A:catalyst B ratio in the FCC unit to a value that correlates with a point in the operating envelope.

10. The process of claim 9 wherein the at least two different catalyst species are each stored in, and supplied by, a separate catalyst addition system.

11. The process of claim 9 wherein the response curve is established through use of three or more different injections of three or more different catalyst A:catalyst B test ratios.

12. The process of claim 9 wherein operating parameter is selected from the group consisting of $SO_x$ emissions, $NO_x$ emissions, CO combustion, gasoline sulfur reduction, olefin product make, olefin product molecular structure, vanadium reduction and $CO_2$ production.

13. The method of claim 9 wherein the operating parameter is the $SO_x$ emissions level of the FCC unit.

14. The method of claim 9 wherein the catalyst A and the second catalyst B are each $SO_x$ reduction catalysts.

* * * * *